(12) United States Patent
Yasuda et al.

(10) Patent No.: US 6,558,152 B2
(45) Date of Patent: May 6, 2003

(54) DISC-MOLDING MOLD

(75) Inventors: Katsuyuki Yasuda, Chiba (JP);
Yasuyoshi Sakamoto, Chiba (JP);
Hiroyuki Sawaishi, Tokyo (JP)

(73) Assignees: Seikoh Giken Co., Ltd., Chiba (JP);
Sumitomo Heavy Industries, Ltd., Tokyo (JP)

( * ) Notice: Subject to any disclaimer, the term of this patent is extended or adjusted under 35 U.S.C. 154(b) by 146 days.

(21) Appl. No.: 09/920,963

(22) Filed: Aug. 3, 2001

(65) Prior Publication Data

US 2002/0018827 A1 Feb. 14, 2002

(30) Foreign Application Priority Data

Aug. 4, 2000 (JP) ........................................ 2000-237293

(51) Int. Cl.⁷ ........................... B29C 45/73; B29D 11/00
(52) U.S. Cl. ..................... 425/552; 425/450.1; 425/810
(58) Field of Search .............................. 425/552, 450.1, 425/810

(56) References Cited

U.S. PATENT DOCUMENTS 5,472,334 A * 12/1995 Takahashi .................... 425/554
5,607,705 A    3/1997 Asai

FOREIGN PATENT DOCUMENTS

| EP | 0 296 677 A1 | 12/1988 |
| EP | 0 899 075 A1 | 3/1999 |
| JP | 63-144028 | 6/1988 |
| JP | 2000-202863 | 7/2000 |

OTHER PUBLICATIONS

Austrian Search Report, FSG006 (Jul. 2001) SG–Search Report, Application No. 200104654–9.
Patent Abstracts of Japan, vol. 1998, No. 4, Mar. 31, 1998 & JP 09 314563 A (Sony Corp), Dec. 9, 1997.
Patent Abstracts of Japan, vol. 1995, No. 6, Jul. 31, 1995 & JP 07 080844 A (Idemitsu Material KK), Mar. 28, 1995.
Patent Abstracts of Japan, vol. 013, No. 528, Nov. 24, 1989 & JP 01 216807 (Toshiba Corp), Aug. 30, 1989.
Patent Abstracts of Japan, vol. 016, No. 561, Dec. 3, 1992 & JP 04 216025 (Toshiba Mach Co., Ltd.), Aug. 6, 1992.

* cited by examiner

Primary Examiner—James P. Mackey
Assistant Examiner—Donald Heckenberg
(74) Attorney, Agent, or Firm—Squire, Sanders & Dempsey, LLP

(57) ABSTRACT

A disc-molding mold includes a first support plate disposed at the stationary side of the mold; a first mirror-surface disc attached to the first support plate; a first guide ring disposed radially outside the first mirror-surface disc and attached to the first support plate; a second support plate disposed at the movable side of the mold; a second mirror-surface disc attached to the second support plate; a second guide ring disposed radially outside the second mirror-surface disc and attached to the second support plate; a guide post attached to either the first or second guide ring and projecting toward the other guide ring; and a guide bushing attached to the other guide ring and adapted to guide the guide post. The first and second guide rings each have a temperature control medium passage formed therein in order to allow passage of a temperature control medium. Thus, the thermal expansion of the first guide ring is made equal to that of the second guide ring.

13 Claims, 4 Drawing Sheets

DISC-MOLDING MOLD

BACKGROUND OF THE INVENTION

1. Field of the Invention

The present invention relates to a disc-molding mold for molding discs.

2. Description of the Related Art

Conventionally, in an injection molding machine for molding disc substrates, resin heated and melted within a heating cylinder is charged into a cavity formed in a disc-molding mold. The molten resin is cooled and solidified within the cavity to thereby obtain a molded disc substrate.

FIG. 1 is a sectional view of a conventional disc-molding mold.

In FIG. 1, a stationary-side mold assembly 12 is fixed to an unillustrated stationary platen by use of unillustrated bolts. The stationary-side mold assembly 12 includes a base plate 15; a disc plate 16 fixed to the base plate 15 by use of bolts 17; a locating ring 23 disposed on the base plate 15 in such a manner as to face the stationary platen and adapted to position the base plate 15 with respect to the stationary platen; and a sprue bushing 24 disposed adjacent to the locating ring 23. A front end (the left end in FIG. 1) of the sprue bushing 24 faces a cavity C, and a die 28 is formed in the front end of the sprue bushing 24. In communication with the die 28, a sprue 26 is formed in the sprue bushing 24 in order to allow passage of resin injected from an injection nozzle of an unillustrated injection unit.

A movable-side mold assembly 32 is attached to an unillustrated movable platen by use of unillustrated bolts. The movable-side mold assembly 32 includes a base plate 35; an intermediate plate 40 attached to the base plate 35 by use of bolts 37; a disc plate 36 attached to the intermediate plate 40 by use of bolts 42; a cylinder 44 which is disposed within the base plate 35 in such a manner as to face the movable platen and which is attached to the intermediate plate 40 by use of bolts 45; and a cut punch 48 which advances and retracts (moves rightward and leftward in FIG. 1) along the cylinder 44 and which has a shape corresponding to the die 28.

A depression is formed on the surface of the disc plate 36 facing the disc plate 16, in order to define the cavity C. When the movable platen is moved toward the stationary platen through operation of an unillustrated mold clamping apparatus to thereby perform mold closing and mold clamping, the disc plate 36 is pressed against the disc plate 16 to thereby form the cavity C therebetween.

A flange 51 integrally formed with the cut punch 48 is disposed within the cylinder 44 such that it can advance and retract. The rear end (the left end in FIG. 1) of the flange 51 is received by the cylinder 44. A cut-punch return spring 52 is disposed on the front side (on the right side in FIG. 1) of the flange 51. The cut-punch return spring 52 urges the flange 51 rearward (leftward in FIG. 1).

When, in the mold-closed state, the flange 51 is advanced (moved rightward in FIG. 1) through feed of oil to an unillustrated drive cylinder, the cut punch 48 is advanced and enters the die 28. As a result, a hole is punched in an unillustrated disc substrate of resin molded within the cavity C.

Meanwhile, the mold assemblies 12 and 32 are aligned with each other by means of guide posts 54. Four guide post holes 53 (two of which are shown in FIG. 1) are formed in the base plate 15 through grinding such that they are arranged on a concentric circle relative to the center of the mold assembly 12. The guide posts 54 are press-fitted into the corresponding guide post holes 53 in such a manner as to project toward the mold assembly 32. Furthermore, the guide posts 54 are fixed to the base plate 15 by use of corresponding bolts 55.

Guide bushing holes 56 are formed through grinding in the intermediate plate 40 at positions corresponding to the guide post holes 53. Guide bushings 57 are press-fitted into the corresponding guide bushing holes 56. The guide bushings 57 guide the corresponding guide posts 54. During mold closing, the guide posts 54 enter the corresponding guide holes formed in the guide bushings 57 via unillustrated ball bearing portions of the guide bushings 57, whereby the mold assemblies 12 and 32 are aligned with each other.

Temperature control medium passages 61 and 62 are formed in the disc plates 16 and 36, respectively. A medium, such as water, oil, or air, is fed into the temperature control medium passages 61 and 62 so as to cool the disc plates 16 and 36, respectively.

However, the conventional disc-molding mold involves the following problem. As resin injected from an injection nozzle passes through the sprue 26 and is charged into the cavity C, a difference in thermal expansion arises between the mold assembly 32 and the mold assembly 12. Specifically, in the mold assembly 32, heat of resin contained in the cavity C is transmitted to the guide bushings 57 via the disc plate 36 and the intermediate plate 40. In the mold assembly 12, not only is the heat transmitted to the guide posts 54 via the disc plate 16 and the base plate 15, but also heat of resin passing through the sprue 26 is transmitted to the guide posts 54 via the sprue bushing 24 and the base plate 15. Thus, a difference in thermal expansion arises between the guide bushings 57 and the guide posts 54. As a result, the guide posts 54 may fail to smoothly enter the corresponding guide holes, resulting in a failure to reliably align the mold assemblies 12 and 32 with each other or resulting in galling of a guide post 54.

SUMMARY OF THE INVENTION

An object of the present invention is to solve the above-mentioned problem in the conventional disc-molding mold and to provide a disc-molding mold capable of reliably aligning a stationary-side mold assembly and a movable-side mold assembly with each other and preventing galling of a guide post.

To achieve the above object, the present invention provides a disc-molding mold, comprising a first support plate disposed at a stationary side of the mold; a first mirror-surface disc attached to the first support plate; a first guide ring disposed radially outside the first mirror-surface disc and attached to the first support plate; a second support plate disposed at a movable side of the mold; a second mirror-surface disc attached to the second support plate; a second guide ring disposed radially outside the second mirror-surface disc and attached to the second support plate; a guide post attached to either the first or second guide ring and projecting towards the other guide ring; and a guide bushing attached to the other guide ring and adapted to guide the guide post.

The first and second guide rings each have a temperature control medium passage formed therein in order to allow passage of a temperature control medium.

Since a temperature control medium flows through the temperature control medium passages formed in the first and second guide rings, the first and second guide rings are equal in thermal expansion. Thus, the guide post can smoothly enter a guide hole formed in the guide bushing, whereby the mold assemblies can be reliably aligned with each other, and galling of the guide post can be prevented.

The temperature control medium passages can be formed in the first and second guide rings more easily than in the first and second support plates, thereby lowering manufacturing cost of the disc-molding mold.

Preferably, the guide post is positioned with respect to the guide ring to which the guide post is to be attached.

Preferably, a guide post hole is formed in the guide ring to which the guide post is to be attached. The guide post is press-fitted into the guide post hole.

Preferably, the guide bushing is positioned with respect to the other guide ring.

Preferably, a guide bushing hole is formed in the other guide ring. The guide bushing is press-fitted into the guide bushing hole.

Preferably, a ball bearing portion is formed on an outer circumferential surface of the guide post in order to enhance sliding performance between the guide bushing and the guide post.

Preferably, the first and second mirror-surface discs each have a temperature control medium passage formed therein in order to allow passage of a temperature control medium.

Preferably, a guide bushing reception hole is formed in the second support plate in order to allow insertion of the guide bushing into the second support plate. A temperature control medium passage adapted to allow passage of a temperature control medium is formed in the second support plate such that the passage assumes the form of a groove extending on the wall of the guide bushing reception hole.

Preferably, a temperature control medium passage adapted to allow passage of a temperature control medium is formed in the guide bushing such that the passage assumes the form of a groove extending on the outer circumferential surface of the guide bushing.

Preferably, a temperature control medium passage adapted to allow passage of a temperature control medium is formed within the guide post.

BRIEF DESCRIPTION OF THE DRAWINGS

The structure and features of the disc-molding mold according to the present invention will be readily appreciated as the same becomes better understood by referring to the accompanying drawings, in which.

DESCRIPTION OF THE PREFERRED EMBODIMENTS

Embodiments of the present invention will next be described in detail with reference to the drawings.

Figure 1:
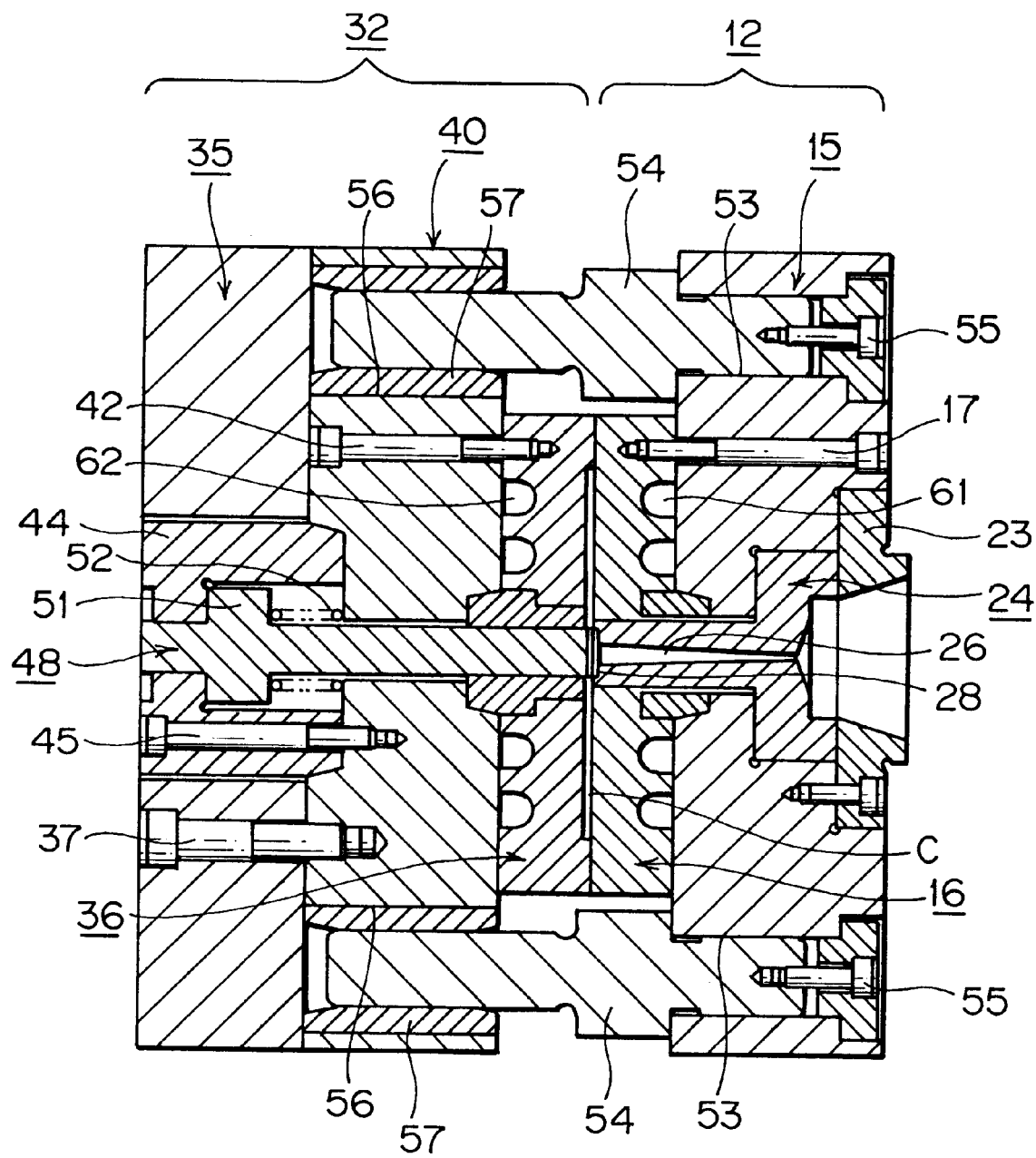
FIG. 1 is a cross-sectional view of a conventional disc-molding mold.
Figure 2:
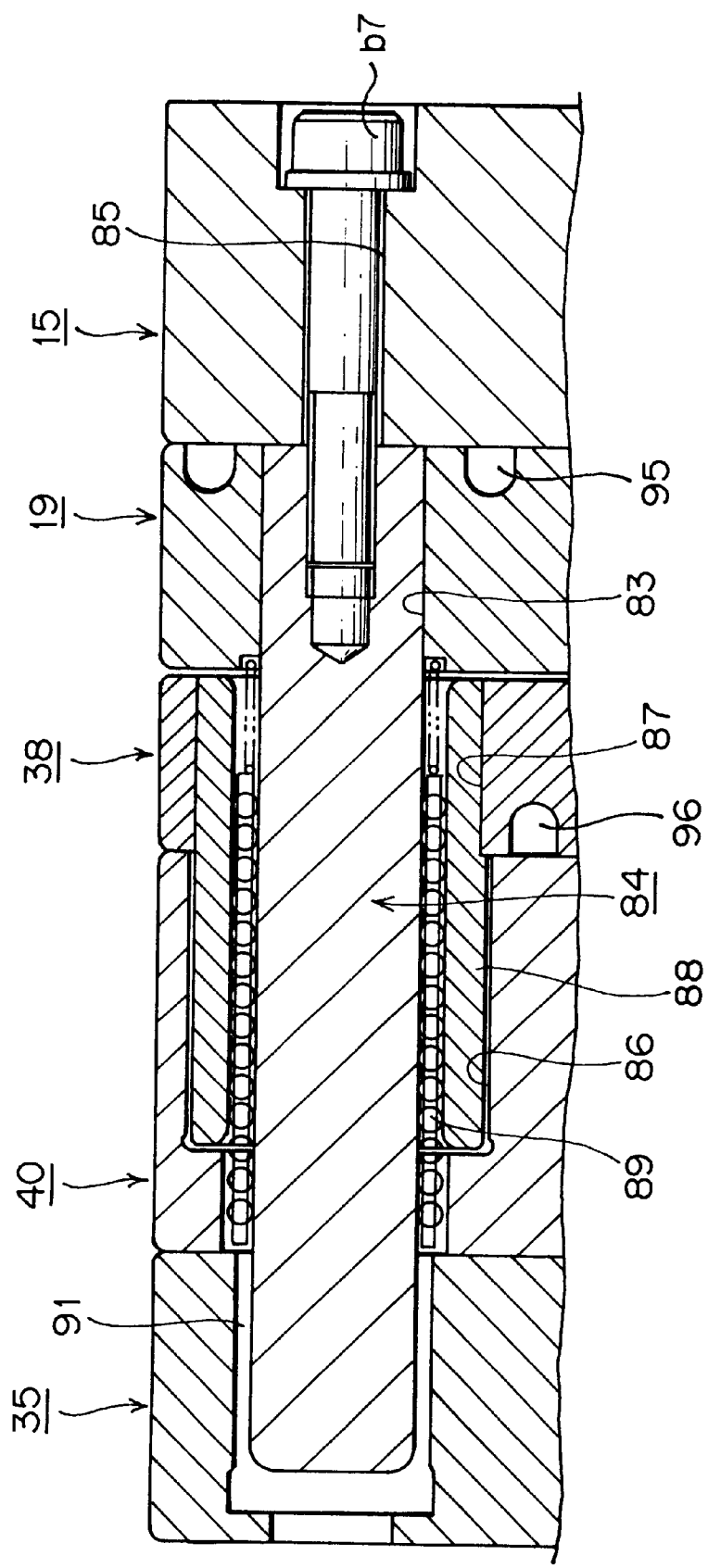
FIG. 2 is a enlarged cross-sectional view showing a main portion of a disc-molding mold according to a first embodiment of the present invention.
Figure 3:
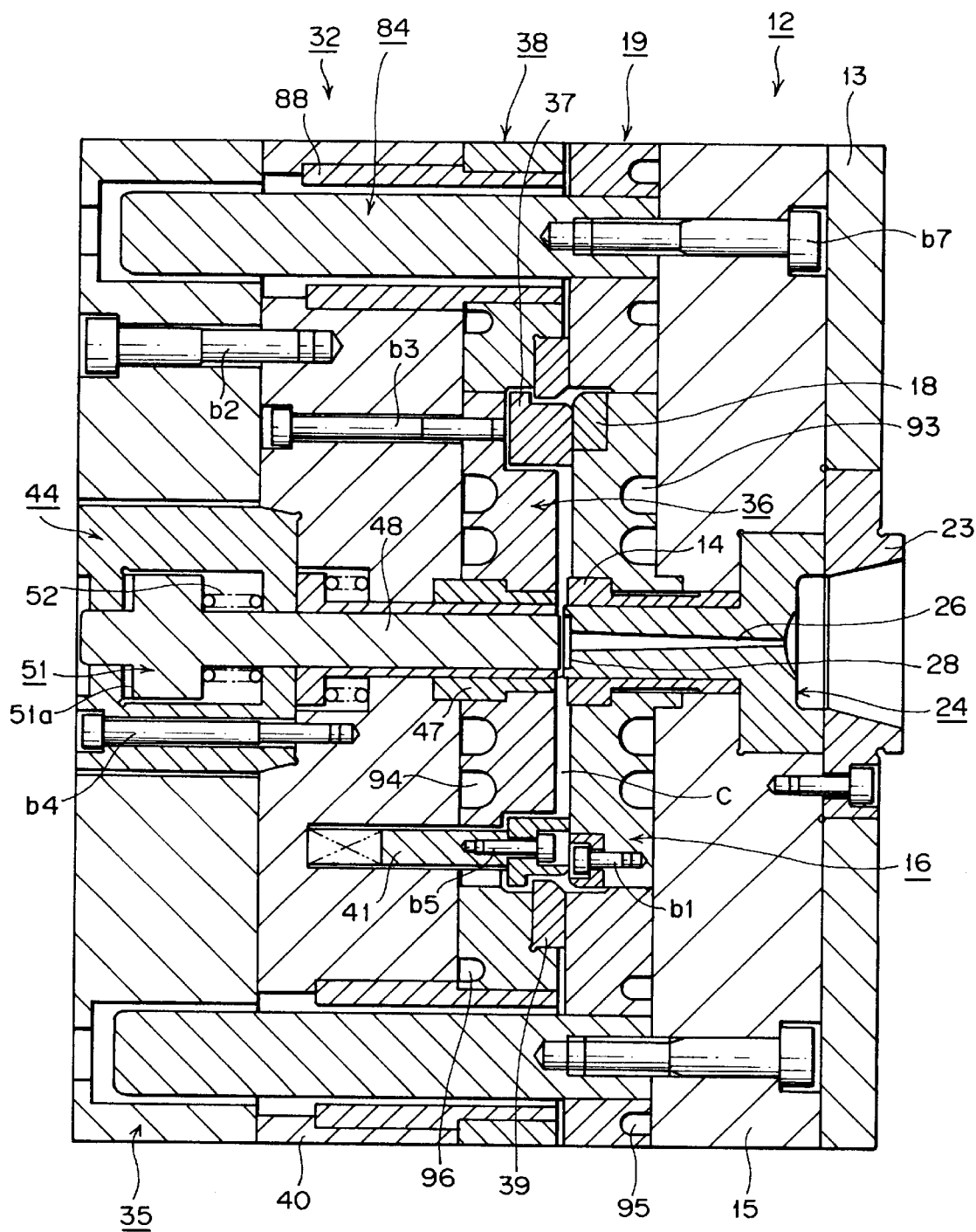
FIG. 3 is a cross-sectional view of the disc-molding mold according to the first embodiment.

FIG. 2 is a sectional view showing a main portion of a disc-molding mold according to a first embodiment of the present invention. FIG. 3 is a sectional view of the disc-molding mold according to the first embodiment.

In FIG. 3, a stationary-side mold assembly 12 is attached to an unillustrated stationary platen via an attachment plate 13 by use of unillustrated bolts. The mold assembly 12 includes a base plate 15, which serves as a first support plate; a disc plate 16 which is attached to the base plate 15 by use of unillustrated bolts and which serves as a first mirror-surface disc; a locating ring 23 disposed on the base plate 15 in such a manner as to face the stationary platen and adapted to position the base plate 15 with respect to the stationary platen; and a sprue bushing 24 disposed adjacent to the locating ring 23. A front end (the left end in FIG. 3) of the sprue bushing 24 faces a cavity C, and a die 28 is formed in the front end.

In communication with the die 28, a sprue 26 is formed in the sprue bushing 24 in order to allow passage of resin injected from the injection nozzle of an unillustrated injection unit. A stamper retainer bushing 14 is disposed radially outside a front half portion (a left half portion in FIG. 3) of the sprue bushing 24 in order to press the inner circumferential edge of an unillustrated stamper. Notably, an unillustrated air blow bushing, and a like component are also disposed in the mold assembly 12.

A butt ring 18 is attached to an outer circumferential edge of the disc plate 16 by use of bolts b1. A first guide ring 19 is disposed radially outside the disc plate 16 and the butt ring 18 and attached to the base plate 15.

A movable-side mold assembly 32 is attached to an unillustrated movable platen by use of unillustrated bolts. The mold assembly 32 includes a base plate 35; an intermediate plate 40 which is attached to the base plate 35 by use of bolts b2 and which serves as the second support plate; a disc plate 36 which is attached to the intermediate plate 40 by use of bolts b3 and which serves as a second mirror-surface disc; a cylinder 44 which is disposed within the base plate 35 in such a manner as to face the movable platen and which is attached to the intermediate plate 40 by use of bolts b4; and a cut punch 48 which advances and retracts (moves rightward and leftward in FIG. 3) along the cylinder 44 and which has a shape corresponding to the die 28.

A cavity ring 37 is disposed along an outer circumferential edge of the disc plate 36 and in opposition to the butt ring 18. A second guide ring 38 is disposed radially outside the disc plate 36 and the cavity ring 37 and in opposition to the first guide ring 19 and is attached to the intermediate plate 40. The cavity ring 37 is attached to rods 41 by use of bolts b5 such that it is disposed movably, via the rods 41, with respect to the intermediate plate 40. A cavity ring retainer 39 is engaged with an outer circumferential edge of the cavity ring 37 and attached to the second guide ring 38 by use of unillustrated bolts. The cavity ring 37 projects from the front end surface (the right end surface in FIG. 3) of the disc plate 36. The inner circumferential surface of a projected portion of the cavity ring 37 is adapted to form the outer circumferential edge of a disc substrate.

A flange 51 formed integrally with the cut punch 48 is disposed within the cylinder 44 such that it can advance and retract. A rear end (the left end in FIG. 3) 51a of the flange 51 is received by the cylinder 44. A cut-punch return spring 52 is disposed ahead of the flange 51 (at the right of the flange 51 in FIG. 3). The cut-punch return spring 52 urges the flange 51 rearward.

When, with the mold assemblies 12 and 32 clamped together, the flange 51 is advanced (moved to the right in FIG. 3) through feed of oil into an unillustrated drive cylinder, the cut punch 48 is caused to advance and enters the die 28. As a result, a hole is punched in an unillustrated disc substrate of resin molded within the cavity C. An unillustrated ejector bushing for ejecting a disc substrate is disposed radially outside a front half portion (a right half portion in FIG. 3) of the cut punch 48. An air blow bushing 47 is disposed radially outside the ejector bushing and adapted to separate a disc substrate from the disc plate 36 through blowing of compressed air against the disc substrate. An unillustrated ejector pin and a like component are disposed in the mold assembly 32.

Four guide post holes 83 (for convenience of illustration, FIG. 2 shows merely a single guide post hole 83) are formed in the guide ring 19 through grinding such that they are arranged on a concentric circle relative to the center of the mold assembly 12. Guide posts 84 are press-fitted into the corresponding guide post holes 83 in such a manner as to project toward the mold assembly 32. The guide posts 84 are connected to the base plate 15 by means of corresponding bolts b7. Bolt holes 85 are formed in the base plate 15 in order to allow insertion of the bolts b7 through the base plate 15. A predetermined clearance is formed between the wall of each bolt hole 85 and the outer circumferential surface of the corresponding bolt b7.

Guide bushing holes 87 are formed through grinding in the second guide ring 38 at positions corresponding to the guide post holes 83. Guide bushings 88 serving as guide members are press-fitted into the corresponding guide bushing holes 87 to thereby guide the corresponding guide posts 84. A ball bearing portion 89 is formed around the outer circumferential surface of each of the guide posts 84 in order to enhance sliding performance between the guide post 84 and the corresponding guide bushing 88.

When the disc-molding mold is to be closed, the guide posts 84 enter the corresponding guide holes of the guide bushings 88 to thereby align the mold assemblies 12 and 32 with each other. The guide bushings 88 extend not only through the guide bushing holes 87 but also through guide bushing reception holes 86 formed in the intermediate plate 40. A predetermined clearance is formed between the wall of each guide bushing reception hole 86 and an outer circumferential surface of the corresponding guide bushing 88. Reception holes 91 are formed in the base plate 35 in order to receive corresponding front end portions (left end portions in FIG. 2) of the guide posts 84 when the disc-molding mold is closed.

In FIG. 3, first and second temperature control medium passages 93 and 94 are formed in the disc plates 16 and 36, respectively. A temperature control medium, such as water, oil, or air, is caused to flow through the first and second temperature control medium passages 93 and 94, to thereby cool the disc plates 16 and 36.

As resin injected from the injection nozzle passes through the sprue 26 and is charged into the cavity C, heat of the resin is transmitted through the mold assemblies 32 and 12 in the following manner. In the mold assembly 32, the heat of resin contained in the cavity C is transmitted to the guide bushings 88 via the disc plate 36 and the second guide ring 38 and via the disc plate 36 and the intermediate plate 40. In the mold assembly 12, not only is the heat transmitted to the guide posts 84 via the disc plate 16 and the first guide ring 19 and via the disc plate 16 and the base plate 15, but also heat of resin passing through the sprue 26 is transmitted to the guide posts 84 via the sprue bushing 24 and the base plate 15. In this case, if a difference in thermal expansion arises between the first and second guide rings 19 and 38, the guide posts 84 fail to smoothly enter the corresponding guide holes, resulting in a failure to reliably align the mold assemblies 12 and 32 with each other or resulting in galling of a guide post 84.

In order to cope with the above problem, third and fourth temperature control medium passages 95 and 96 are formed in the first and second guide rings 19 and 38, respectively. A temperature control medium, such as water, oil, or air, is caused to flow through the third and fourth temperature control medium passages 95 and 96, to thereby cool the first and second guide rings 19 and 38. The third and fourth temperature control medium passages 95 and 96 are connected to an unillustrated temperature controller by means of unillustrated lines, through which a medium whose temperature is adjusted to a predetermined value is circulated and supplied to the third and fourth temperature control medium passages 95 and 96. As a result, the first and second guide rings 19 and 38 are cooled accordingly.

Thus, the temperature of the first guide ring 19 becomes substantially equal to that of the second guide ring 38, thereby preventing occurrence of a difference in thermal expansion between the first and second guide rings 19 and 38. The guide posts 84 are press-fitted into the corresponding guide post holes 83, and the guide bushings 88 are press-fitted into the corresponding guide bushing holes 87. The guide posts 84 are positioned with respect to the first guide ring 19, and the guide bushings 88 are positioned with respect to the second guide ring 38. Thermal expansion of the first guide ring 19 is equal to that of the second guide ring 38. Thus, the guide posts 84 can smoothly enter the corresponding guide holes, whereby the mold assemblies 12 and 32 can be reliably aligned with each other, and galling of a guide post 84 can be prevented.

The third and fourth temperature control medium passages 95 and 96 can be formed in the first and second guide rings 19 and 38 more easily than in the base plate 15 and the intermediate plate 40, thereby lowering manufacturing cost of the disc-molding mold.

According to the present embodiment, a medium supplied to the first and second temperature control medium passages 93 and 94 differs from that supplied to the third and fourth temperature control medium passages 95 and 96. However, a common medium may be supplied to the first through fourth temperature control medium passages 93 to 96. In this case, the aforementioned lines are branched to supply the common medium to the first through fourth temperature control medium passages 93 to 96.

The present embodiment is described while mentioning the guide posts 84 attached to the first (one) guide ring 19 and the guide bushings 88 attached to the second (the other) guide ring 38. However, the present invention is not limited thereto. For example, guide bushings are attached to the first guide ring 19, whereas guide posts are attached to the second guide ring 38.

Next, a second embodiment of the present invention will be described. Structural features similar to those of the first embodiment are denoted by common reference numerals, and repeated description thereof is omitted.

Figure 4:
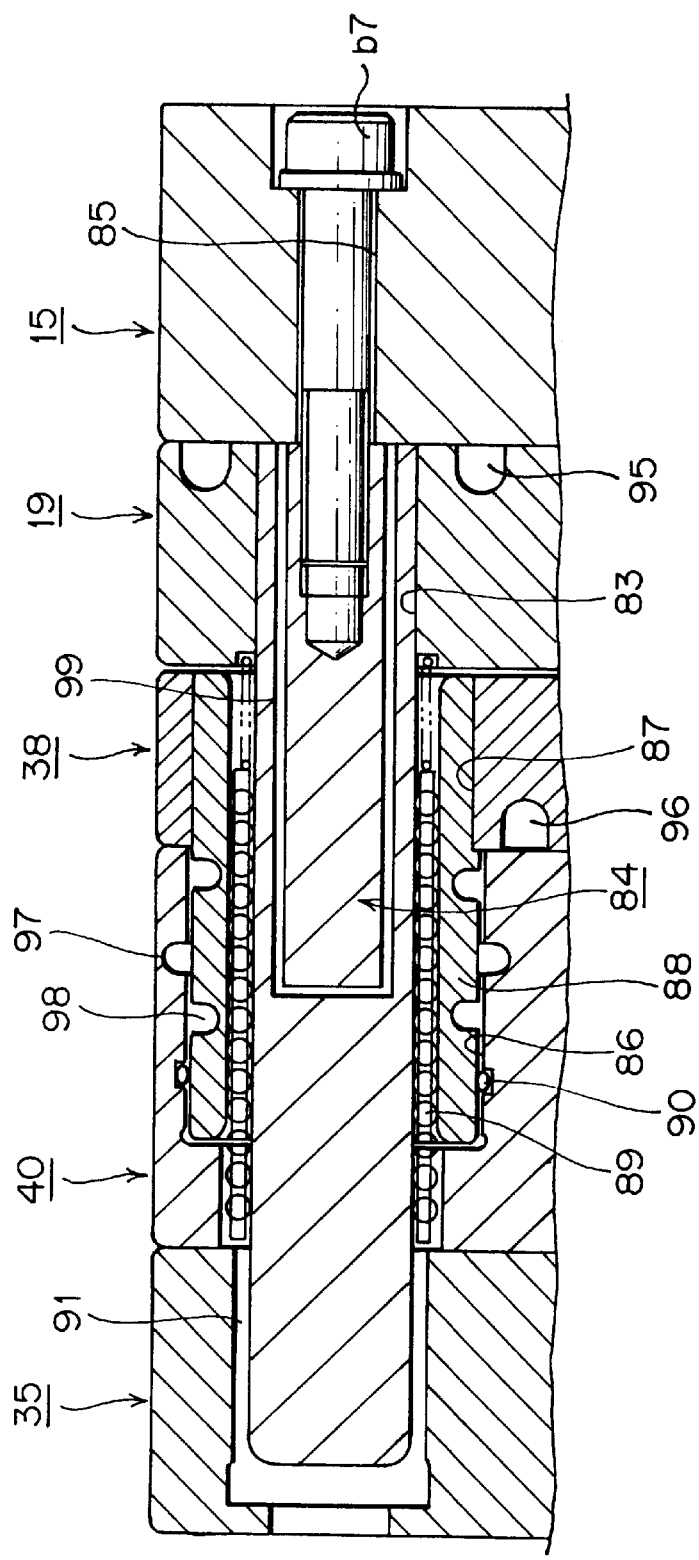
FIG. 4 is a cross-sectional view showing a main portion of a disc-molding mold according to a second embodiment of the present invention.

FIG. 4 is a sectional view showing a main portion of a disc-molding mold according to the second embodiment.

A fifth temperature control medium passage 97 is formed in the intermediate plate 40 such that the passage 97 assumes the form of a groove extending on the wall of each of the guide bushing reception holes 86. A sixth temperature control medium passage 98 is formed in each of the guide bushings 88 such that the passage 98 assumes the form of a groove extending on the outer circumferential surface of each of the guide bushings 88. A medium flowing through the fifth and sixth temperature control medium passages 97 and 98 cools the guide bushings 88. Furthermore, a seventh temperature control medium passage 99 is formed in each of the guide posts 84. A medium flowing through the seventh temperature control medium passage 99 cools the guide posts 84.

An O-ring 90 serving as a seal member is disposed in the vicinity of a front end portion (a left end portion in FIG. 4) of each of the guide bushings 88 so as to seal the clearance between the wall of the guide bushing reception hole 86 and the outer circumferential surface of the guide bushing 88.

The present invention is not limited to the above-described embodiments. Numerous modifications and variations of the present invention are possible in light of the spirit of the present invention, and they are not excluded from the scope of the present invention.

What is claimed is:

1. A disc-molding mold, comprising:
    a first support plate disposed at a stationary side of said mold;
    a first mirror-surface disc attached to said first support plate;
    a first guide ring disposed radially outside said first mirror-surface disc and attached to said first support plate;
    a second support plate disposed at a movable side of said mold;
    a second mirror-surface disc attached to said second support plate;
    a second guide ring disposed radially outside said second mirror-surface disc and attached to said second support plate;
    a guide post attached to either said first or second guide ring and projecting toward the other guide ring; and
    a guide bushing attached to the other guide ring and adapted to guide said guide post;
    said first and second guide rings each having a temperature control medium passage formed therein in order to allow passage of a temperature control medium.

2. A disc-molding mold according to claim 1, wherein said guide post is positioned with respect to said guide ring to which said guide post is to be attached.

3. A disc-molding mold according to claim 2, wherein
    a guide post hole is formed in said guide ring to which said guide post is to be attached; and
    said guide post is press-fitted into the guide post hole.

4. A disc-molding mold according to claim 1, wherein said guide bushing is positioned with respect to the other guide ring.

5. A disc-molding mold according to claim 4, wherein
    a guide bushing hole is formed in the other guide ring; and
    said guide bushing is press-fitted into the guide bush hole.

6. A disc-molding mold according to claim 1, wherein a ball bearing portion is formed on an outer circumferential surface of said guide post in order to enhance sliding performance between said guide bushing and said guide post.

7. A disc-molding mold according to claim 1, wherein said first and second mirror-surface discs each have a temperature control medium passage formed therein in order to allow passage of a temperature control medium.

8. A disc-molding mold according to claim 1, wherein
    a guide bushing reception hole is formed in said second support plate in order to allow insertion of said guide bushing into said second support plate; and
    a temperature control medium passage adapted to allow passage of a temperature control medium is formed in said second support plate such that the passage assumes a form of a groove extending on a wall of the guide bushing reception hole.

9. A disc-molding mold according to claim 1, wherein a temperature control medium passage adapted to allow passage of a temperature control medium is formed in said guide bushing such that the passage assumes a form of a groove extending on an outer circumferential surface of said guide bushing.

10. A disc-molding mold according to claim 1, wherein a temperature control medium passage adapted to allow passage of a temperature control medium is formed within said guide post.

11. A disc-molding mold according to claim 2, wherein said guide bushing is positioned with respect to the other guide ring.

12. A disk-molding mold, comprising:
    a first support plate disposed at a stationary side of said mold;
    a first mirror-surface disc attached to said first support plate;
    a first guide ring disposed radially outside said first mirror-surface disc and attached to said first support plate;
    a second support plate disposed at a movable side of said mold;
    a second mirror-surface disc attached to said second support plate;
    a second guide ring disposed radially outside said second mirror-surface disc and attached to said second support plate;
    a guide post attached to either said first or second guide ring and projecting toward the other guide ring;
    a guide bushing attached to the other guide ring and adapted to guide said guide post; and
    means for controlling temperature of the first and second guide rings.

13. A disk-molding mold according to claim 11, wherein the means for controlling temperature of the first and second guide rings is operative to cause the first and second guide rings to have a substantially equal temperature.

* * * * *